Registered May 12, 1931 1,805,026

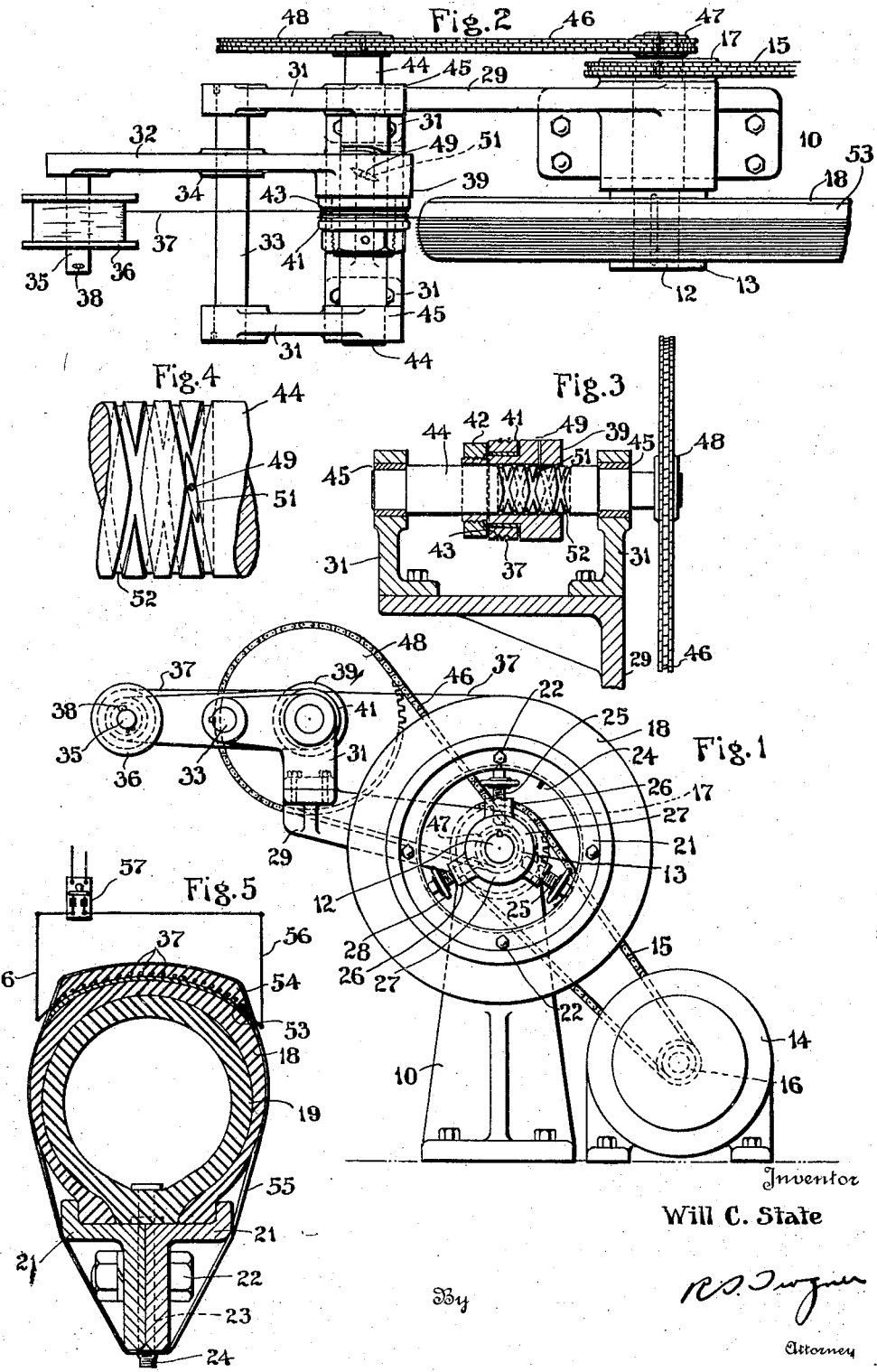

UNITED STATES PATENT OFFICE

WILL C. STATE, OF AKRON, OHIO, ASSIGNOR TO THE GOODYEAR TIRE & RUBBER COMPANY, OF AKRON, OHIO, A CORPORATION OF OHIO

METHOD OF SECURING A TREAD TO A TIRE CARCASS

Application filed September 7, 1928. Serial No. 304,497.

This invention relates to methods of and apparatus for constructing tire casings, and it has particular relation to a novel method of applying a tread to a tire carcass and to an apparatus adapted to be employed in practicing the method.

It has been proposed to vulcanize a tread to a tire carcass by utilizing electrically energized heating devices, which are interposed between the tread and the carcass to cause vulcanization of the elements, and they constitute a part of the completed article.

The heating elements heretofore employed have been preformed by various methods prior to their application to the tire carcass, and are consequently expensive. Furthermore, they are very bulky and by their presence between the tread and the carcass they cause a weak and imperfect union between these two elements.

One object of this invention is to obviate the above-mentioned disadvantages by the provision of a novel method which involves the application of a continuous length of electrical conductor directly to the carcass of the tire, whereby no preforming of the electrical heating element is necessary and the element serves to strengthen rather than to weaken the bond between the tread and the tire carcass in the completed aricle.

Another object of the invention is to provide a simple and efficient apparatus, whereby a continuous length of resistance wire may be circumferentially applied in spaced convolutions to a tire carcass to serve as a heating element for vulcanizing a tread thereto.

For a better understanding of the invention reference may now be had to the accompanying drawings forming a part of the disclosure, wherein:

Figure 1 is a side elevational view of an apparatus embodying certain features of the invention;

Figure 2 is a fragmentary plan view, on a larger scale, of a portion of the apparatus shown in Figure 1;

Figure 3 is a fragmentary detail view, partially in section and partially in elevation, illustrating a mechanism for moving the wire-supplying means as the chuck is rotated;

Figure 4 is a fragmentary detail view, on a larger scale, of a portion of the structure shown in Figure 3; and Figure 5 is a cross-sectional view illustrating the manner in which the tread and tire are confined for the vulcanizing operation.

The method herein described involves the mounting of a tire carcass for rotation about its axis, the application of a gum strip to the carcass circumferentially, and the application of an electrical conductor of comparatively high resistance arranged in spaced convolutions about the circumference of the carcass. A semi-cured tread is then applied to the carcass and is bound thereto by a fabric wrapping strip. An airbag disposed within the carcass is inflated to provide the necessary pressure and the heating element, composed of the spaced convolutions of resistance wire, is energizd to cause vulcanization of the tread to the tire carcass.

The apparatus shown in the accompanying drawings, broadly considered, involves a supporting stand having a shaft journalled therein which carries a tire-supporting chuck. A wire-supplying mechanism is movably secured to an extending portion of the stand and means is provided for moving the wire-supplying mechanism axially of the tire carcass, that is, in a direction parallel to the axis of the carcass, as the latter is rotated. This movement causes the wire to be wound in spaced convolutions upon the carcass.

In the accompanying drawings a stand 10 rotatably supports a shaft 12 which has keyed to one end thereof an adjustable tire chuck 13. A motor 14 secured to the base of the stand 10 serves to rotate the shaft 12 through the agency of a chain 15 trained about a sprocket wheel 16 on the shaft of the motor and a sprocket wheel 17 rigidly secured to the shaft 12.

As shown, a tire carcass 18 and an airbag 19 disposed therein are mounted in the usual manner upon a pair of coacting rings 21 which are secured together by bolts 22 traversing the inwardly extending flanges of the rings. Registrating grooves 23 are provided in the rings 21 to accommodate the valve stem 24 of the airbag. A plurality of arms 25, threaded into bosses 26 extending radially outwardly from the hub 27 of the chuck 13, are provided with hand wheels 28 whereby they may be adjusted into and out of engagement with the rings 21 upon which the tire carcass 18 is mounted.

An extension 29 integral with or otherwise rigidly secured to the stand 10 projects horizontally therefrom and has bolted thereto a pair of spaced upright journal members 31. An arm 32 is slidably carried upon the extension 29 by means of a rod 33 which is rigidly secured at its ends to the respective journal members 31 and traverses an apertured boss 34 disposed centrally of the arm 32. A pin 35 extending at right angles from the arm 32 serves rotatably to support a reel 36 of resistance wire 37, and a cotter pin 38 traversing the pin 35 prevents accidental displacement of the reel 36.

The end of the arm 32 remote from the pin 35 is formed with an apertured boss 39 upon which a sleeve 41 is rotatably mounted and maintained in position by means of a nut 42 threaded on the boss. The wire 37 in its passage from the reel 36 to the circumference of the tire carcass 18 is wrapped a plurality of times about the sleeve 41 and lies in grooves 43 provided for this purpose on the sleeve 41. A shaft 44 is rotatably mounted in suitable bearings 45 provided in the respective journal members 31 and traverses the bosses 39 of the arm 32. A chain 46 trained about sprocket wheels 47 and 48 which are keyed to the shafts 12 and 44, respectively, serves to rotate the shaft 44 when the shaft 12, and consequently the tire carcass 18 carried thereby, is rotated.

A pivot pin 49 extending from the exterior to the interior of the boss 39 has pivotally connected to its inner end a follower 51 which is disposed in a double thread 52 formed upon the central portion of the shaft 44. Rotation of the shaft 44 causes movement of the arm 32 longitudinally of the shaft 44 by reason of the arrangement of the follower 51 within the threads 52.

The provision of a double thread causes the arm to reverse its direction of movement automatically when the follower reaches either end of the double thread 52. The sprockets 47 and 48, as shown, are of such size that the carcass 18 is rotated through approximately 20 complete revolutions while the arm travels from one end of the double thread to the other. It will be observed that provision of this particular feed for the wire supplying mechanism obviates the necessity of resetting the mechanism for operation upon each tire carcass. When the wire has been applied to one carcass and the latter is removed from the chuck 13 the wire-supplying mechanism is in proper position for applying the wire to a second carcass, that is, the arm 32 moves in one direction for the winding of wire upon one tire and in the opposite direction for the succeeding tire.

In practicing the invention the tire carcass 18, having an airbag 19 disposed therein, is mounted upon the pair of rings 21 which are secured together in the usual manner by the bolts 22. This assembly is then operatively positioned upon the chuck 13 by manipulation of the hand wheels 28. Although the tire carcass, being composed of frictioned fabric elements, is capable of receiving and holding the resistance wire as it is wound thereon from the reel 36, it is preferable first to apply a gum strip 53 to the portion of the carcass 18 which is to contact with the tread 54.

A portion of the wire 37 spaced from the end thereof is embedded adjacent one edge of the strip 53 and the motor 14 is energized to cause rotation of the carcass 18, together with movement of the arm 32 axially of, and in synchronism with, the rotation of the carcass.

After the tread has been applied to the gum strip 53, which has the resistance wire 37 embedded therein, the carcass 18, the tread 54, the airbag 19 and the rings 21 are removed in assembled relation from the chuck and a binder 55 is wrapped thereabout to retain the tread and carcass in proper assembled relation.

The ends 56 of the heating wire 37 are then connected to a source 57 of electrical current which results in sufficient heating of the spaced convolutions to insure proper vulcanization of the tread to the carcass. It is preferable to increase the inflation in the airbag slightly during this operation in order to insure the proper degree of pressure for the vulcanizing operation.

From the foregoing description it is apparent that a novel method of applying a tread to a tire carcass has been provided which is very simple, inexpensive and efficient. The invention also provides a novel mechanism whereby an electrical heating element may be quickly applied to a rotating tire carcass in a novel manner.

Although I have illustrated only one form which may be employed in the practice of my invention, it will be apparent to those skilled in the art that the invention is not so limited, that the embodiment shown is capable of various minor modifications, and that other embodiments may be employed without departing from the spirit of the invention or from the scope of the appended claims.

What I claim is:

1. The method of securing a tread to a tire carcass which includes applying an electrical conductor in spaced convolutions circumferentially of a tire carcass, applying a tread to the carcass, and passing an electric current through the conductor to vulcanize the tread to the carcass.

2. The method of securing a tread to a tire carcass which includes mounting a tire carcass for rotation, attaching a portion of an electrical conductor to the carcass, rotating the carcass to draw the conductor from a source of supply and moving the source of supply axially of the carcass as the latter is rotated, applying a tread to the carcass, confining the tread and carcass, and passing an electric current through the conductor.

3. The method of securing a tread to a tire carcass which includes mounting a tire carcass for rotation, applying a gum strip to the carcass, embedding a portion of an electrical conductor in the gum strip, rotating the carcass to draw the conductor from a source of supply, moving the source of supply axially of the carcass as the latter is rotated, applying a tread to the carcass, confining the tread and carcass, and passing an electric current through the conductor to vulcanize the tread to the carcass.

4. The method of securing a tread to a tire carcass which includes mounting a tire carcass for rotation, applying a gum strip to the carcass, embedding a portion of an electrical conductor in the gum strip adjacent an edge thereof, rotating the carcass to draw the conductor from a source of supply, moving the source of supply axially of the carcass as the latter is rotated to cause the winding of spaced convolutions of the conductor circumferentially upon the carcass, applying a tread to the carcass, and passing an electric current through the conductor to vulcanize the tread to the carcass.

5. The method of securing a tread to a tire carcass which includes mounting a tire carcass for rotation, applying a gum strip to the carcass, embedding a portion of an electrical conductor in the gum strip adjacent an edge thereof rotating the carcass to draw the conductor from a source of supply, moving the source of supply axially of the carcass as the latter is rotated to cause the winding of spaced convolutions of the conductor circumferentially upon the carcass, applying a tread to the carcass, confining the tread and carcass under pressure and passing an electric current through the conductor to vulcanize the tread to the carcass.

6. A method of manufacturing pneumatic vehicle tires which comprises winding a plurality of spaced peripherally extending convolutions of an electrical resistance element upon the carcass of the tire, subsequently applying the tread element to the carcass and them raising the temperature of the tire to the vulcanization point by passing electrical current through the resistance element.

7. A method of manufacturing pneumatic vehicle tires which comprises disposing an electrical resistance unit upon the carcass of the tire, applying a semi-vulcanized tread unit to the carcass, and then raising the temperature of the carcass to the vulcanization point by passing electrical current through the resistance element.

In witness whereof, I have hereunto signed my name.

Signed at Akron, in the county of Summit and State of Ohio, U. S. A., this 6th day of September, 1928.

WILL C. STATE.